INVENTOR.
RICHARD H. LONG
BY
ATTORNEY

May 27, 1952   R. H. LONG   2,598,184
ELECTRICAL CONTROL MECHANISM
Filed Dec. 15, 1948   3 Sheets-Sheet 2

INVENTOR.
RICHARD H. LONG
BY
ATTORNEY

Patented May 27, 1952

2,598,184

UNITED STATES PATENT OFFICE 2,598,184

ELECTRICAL CONTROL MECHANISM

Richard H. Long, South Bend, Ind., assignor to Bendix Aviation Corporation, South Bend, Ind., a corporation of Delaware Application December 15, 1948, Serial No. 65,489

8 Claims. (Cl. 192—3.6)

This invention relates to electrical control mechanisms particularly adapted for use in the power plant of an automotive vehicle.

It is an object of my invention to provide, in an automotive vehicle including a change speed transmission operating mechanism and a friction clutch control mechanism or other clutch control mechanism for the power transmitting mechanism of the power plant of the vehicle, said mechanisms including electrical means for controlling the operation of said mechanisms comprising a governor controlled electrical relay mechanism operable to successively operate the transmission operating mechanism and the clutch control mechanism.

Yet another and important object of my invention is to provide an electrical control mechanism suitable for use as a control in the power plant of an automotive vehicle, the switches of said mechanism being free of any fluttering or hunting operation.

Yet another object of my invention is to provide, in the power plant of an automotive vehicle including a friction clutch and an overdrive transmission, power means operable, when energized, to establish the transmission in its overdrive setting, power means for operating the clutch, and means, operable in accordance with the position of the accelerator of the vehicle and in accordance with the speed of the vehicle, for controlling the operation of both of said power means to successively effect a kickdown setting of the transmission, a disengagement of the clutch, a re-engagement of the clutch, and an overdrive setting of the transmission.

A further object of my invention is to provide, in an automotive vehicle, a transmission operating mechanism and a clutch control mechanism, said mechanism including electrical control means comprising a governor operated switch mechanism and a relay mechanism operative to effect a clutch disengaging operation of the clutch control mechanism at a certain vehicle speed, effect a clutch engaging operation of the latter mechanism at a vehicle speed appreciably higher than the aforementioned speed, and effect two different operations of the transmission operating mechanism, one of the latter operations being effected at a certain vehicle speed and the other operation being effected at another and appreciably higher vehicle speed.

The above and other objects and features of the invention will appear more fully hereinafter from a consideration of the following description taken in connection with the accompanying drawings where one embodiment of the invention has been illustrated by way of example.

Figure 1:
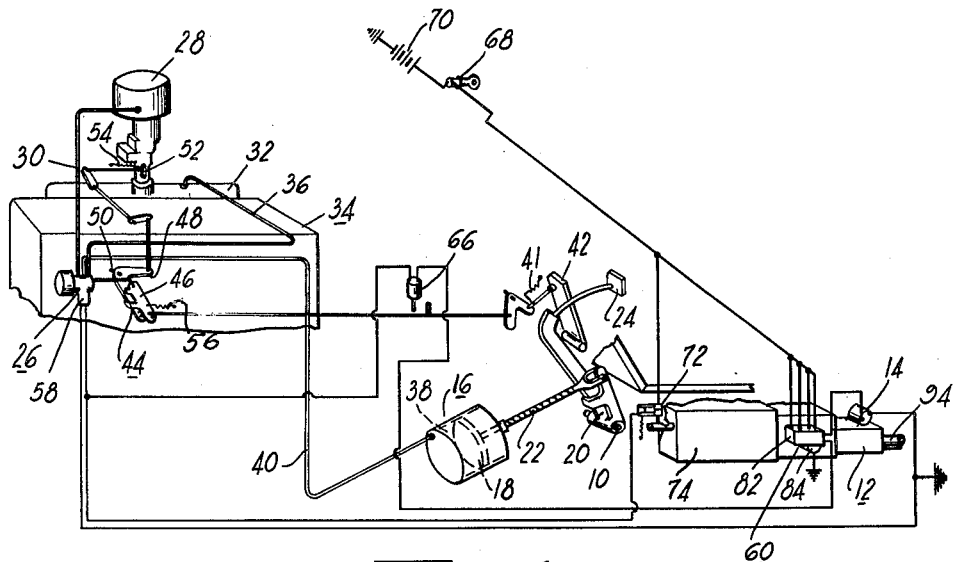
Figure 1 is a diagrammatic view disclosing the principal features of a preferred embodiment of my invention, the governor operated switch mechanism and hold-down relay mechanism cooperating therewith, constituting the essence of my invention, serving to control a clutch control mechanism and a transmission overdrive mechanism.

Referring now to Figure 1 of the drawings a friction clutch, not shown, in the power plant of an automotive vehicle is actuated by a shaft 10; and a change speed transmission 12 coupled to the power plant is actuated by a grounded electrical solenoid 14. Preferably the transmission 12 is of the well known overdrive type which may include a sun gear and cooperating parts; and the transmission operating solenoid 14 is preferably of the type including pull-in and hold-in coils. It is to be noted here however that my invention is not limited to the combination of an overdrive transmission, a friction clutch, and means for operating these particular mechanisms; for the hereinafter described mechanism, constituting the principal feature of my invention, may be employed to successively control two other torque transmitting and/or control mechanisms of the power plant of an automotive vehicle.

The aforementioned friction clutch of the power plant is preferably actuated by a single acting vacuum motor 16 including a power element 18 connected to a clutch operating crank 20 by a flexible connection 22. A manually operated clutch pedal 24, rotatably mounted on the clutch shaft 10, may also be included in the clutch operating mechanism.

Figure 4:
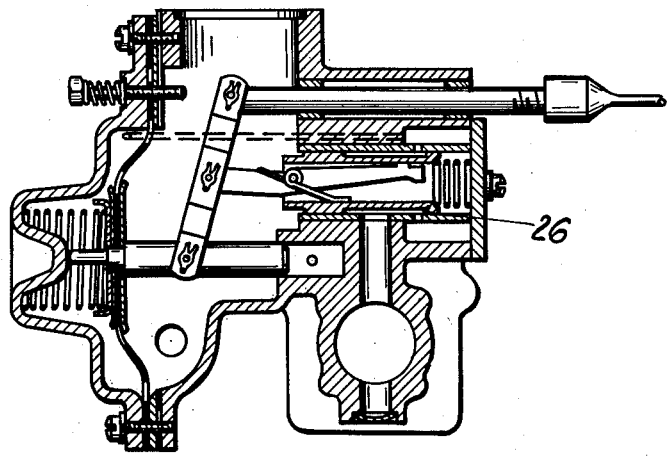
Figure 4 is a sectional view of the valve unit disclosed in Figure 1.

The vacuum motor 16 is controlled by a three-way valve 26 disclosed in detail in Fig. 4 said valve being preferably connected to an air cleaner 28 by a conduit 30, to the intake manifold 32 of the internal combustion engine 34 by a conduit 36, and to the control compartment 38 of the motor 16 by a conduit 40. The valve 26 is operated, to connect the vacuum motor to either the atmosphere, or to the intake manifold as a source of vacuum, by the accelerator 42 of the vehicle; and the force transmitting means interconnecting the accelerator and valve preferably includes a lost motion linkage 44 operable to effect a clutch engaging operation of the valve 26 just before the throttle is open and to effect a clutch disengaging operation of said valve just after the throttle is closed to its engine idling position. The accelerator is preferably biased to its closed position by a spring 41.

The lost motion linkage 44 preferably includes a crank pivotally connected to bell crank lever 48 which is pivotally mounted to a fixed pivot 50. The lever 48 is connected to a throttle operating crank 52, the latter being biased to its throttle closed position by a spring 54; and the crank 46 is biased into contact with the lever 48 by a spring 56 which is weaker than the spring 54. Depression of the acelerator serves first to rotate the crank 46 without opening the throttle this operation being effected by virtue of the relative strengths of the springs 56 and 54; and this operation serves to close the valve 26 thereby venting the motor chamber 38 to the atmosphere; and the latter operation results in an engagement of the clutch. Release of the accelerator to idle the engine 34 serves to open the valve 26 thereby connecting the motor compartment 38 to the intake manifold as a source of vacuum; and this operation serves to partially evacuate said compartment thereby subjecting the power element 18 of the motor to a differential of pressures the right side of the power element being subjected to the pressure of the atmosphere via an opening in the vacuum motor 16. It follows therefore that the motor 16 is energized to disengage the clutch when the accelerator is released to idle the engine of the vehicle.

Figure 5:
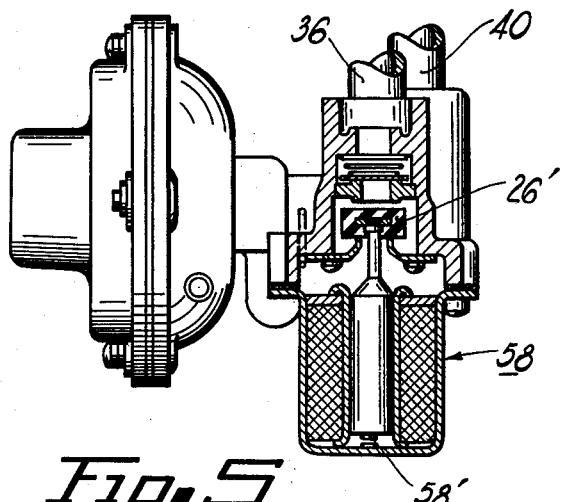
Figure 5 is a sectional view disclosing the solenoid operated three-way valve constituting part of the valve unit of Figure 1.

The vacuum connection to the valve 26 is preferably controlled by a three-way valve 26' disclosed in detail in Figure 5, said valve being operated by a spring 58' and a grounded solenoid 58. Energization of the solenoid 58 serves to open the valve 26' to provide a source of vacuum for the valve 26; and with a de-energization of the solenoid 58 the spring operates to close the valve thereby venting the valve 26 to the atmosphere. The three-way valve 26 and the three-way valve operated by the solenoid 58 are disclosed in the application of Price et al. Serial No. 740,158 filed April 8, 1947, now Patent #2,571,162; accordingly, no claim is made thereto in the instant application.

Figure 2:
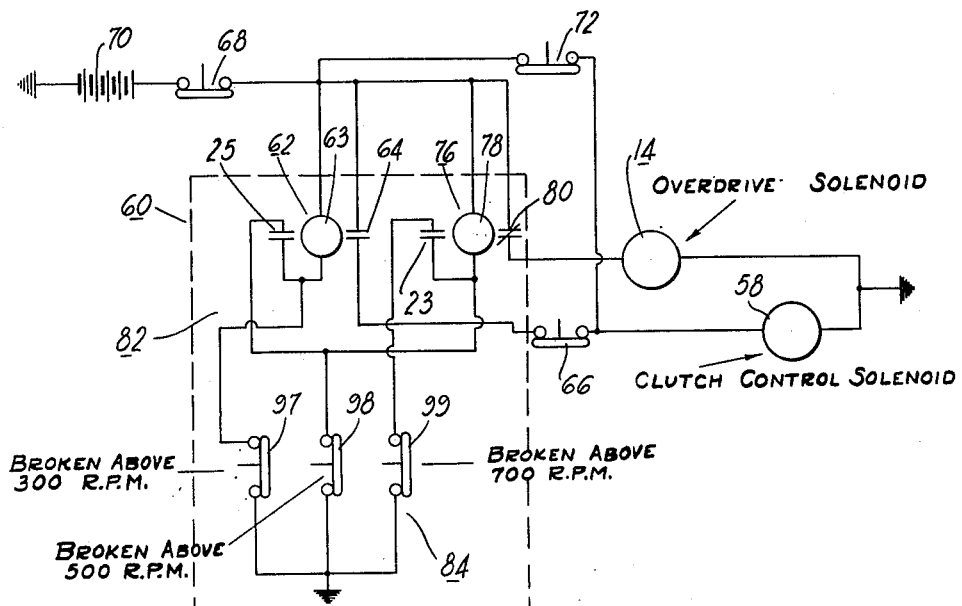
Figure 2 is a view disclosing the electrical hook-up of the mechanism of my invention.

The grounded solenoid 58, which constitutes one of the elements of the mechanism of my invention, is controlled by the electrical mechanism disclosed in Figure 2 and this mechanism, including a governor operated switch mechanism 84, is indicated as a whole by the reference numeral 60. The electrical mechanism preferably includes a clutch control lock-in relay 62 comprising a normally open lock-in switch 25, a coil 63, and a normally open load switch 64; and the latter control is electrically connected in series with an accelerator operated breaker switch 66, the grounded clutch control solenoid 58, the ignition switch 68 of the vehicle, and a grounded battery 70. The solenoid 58 is also preferably controlled by a normally closed cut-out switch 72 which is opened by a selective gear transmission 74 of the vehicle when said transmission is established in a certain setting, say its high gear setting. As is disclosed in Figure 2 the switch 72 is electrically connected in parallel with the circuit including the acelerator operated switch 66 and relay switch 64.

There is thus provided a clutch control mechanism operative to effect an automatic disengagement of the clutch when the transmission 74 is established in any gear except high gear and the accelerator is released to open the valve 26; and the clutch is then re-engaged when the accelerator is depressed to close the latter valve. Assuming the transmission 74 to be established in its high gear setting the clutch is disengaged when the accelerator operated switch 66 is closed by releasing the accelerator and the speed of the vehicle is low enough to effect a closing of the relay switch 64; the clutch is then re-engaged if either the accelerator is depressed to close the valve 26 or the vehicle is speeded up sufficiently to effect an opening of the switch 64. The operation of the latter switch is described hereinafter.

Continuing the description of the mechanism of Figure 2 the grounded solenoid or often called overdrive motor 14 is preferably controlled by a lock-in relay 76 comprising a normally open lock-in switch 23, a coil 78 and a normally closed load controlling switch 80; and the latter switch is electrically connected in series with the grounded solenoid motor 14, the ignition switch 68, and the grounded battery 70.

The relay mechanism, including the clutch control lock-in relay 62 and the overdrive lock-in relay 76, is indicated as a whole by the reference numeral 82, Figure 2; and this relay mechanism is controlled by a governor operated switch mechanism 84. The latter switch mechanism, disclosed in detail in Figure 3, includes a two-part casing 86 housing a governor mechanism comprising centrifugal weights 88 pivotally mounted on pins 90. The latter pins are preferably mounted in a channel shaped plate 92 which is fixedly mounted on the upper end of a drive shaft 93 said shaft being drivably connected, by means, not shown, to the drive shaft 94 of the vehicle. A pin 95, secured to the upper end of the drive shaft, serves as a guide and support for a hollow thrust pin 96 sleeved over the pin 95.

The switch mechanism of the governor operated switch unit 84 is housed within the upper portion of the two-part casing 86 and includes three switches 97, 98, and 99. The switch 97 includes a fixed contact 71 fixedly secured to the casing by undisclosed means; and said switch also includes a movable contact 73 secured to a channel shaped switch support member 75 said member being biased downwardly by a spring 77 to effect a closure of the switch. The switch supporting channel shaped member 75 is preferably of a length extending substantially across the width of the switch casing and is also pivotally supported at its central portion. No claim is made to this switch mechanism, accordingly, the same is not disclosed in greater detail herein.

The switch 98, duplicating the switch 97, includes a fixed contact 79 secured to the switch casing and a movable contact 81 secured to a support member 83; and as with the switch 97 the movable contact 81 of the switch 98 is biased into contact with the fixed contact 79 by the operation of a spring said spring being indicated by the reference numeral 83'. The switch 99, duplicating the switches 97 and 98, includes a fixed contact 61, a movable contact 63' secured to a support member 65, and a spring 67 biasing the movable contact 63 into engagement with the fixed contact 61 to close the switch. The fixed contacts of the switches 97, 98, and 99 are preferably grounded as disclosed in Figure 2; and the movable contacts 73, 81, and 63' of said switches are wired respectively to the coil 63 of the lock-in relay 62, to the lock-in switch 25 of the lock-in relay 62 and to the coil 78 of the lock-in relay 76, and to the lock-in switch 23 of the lock-in relay 76. It is to be particularly noted that the grounded switch 98 serves as a control for both of the relays 62 and 76.

Figure 3:
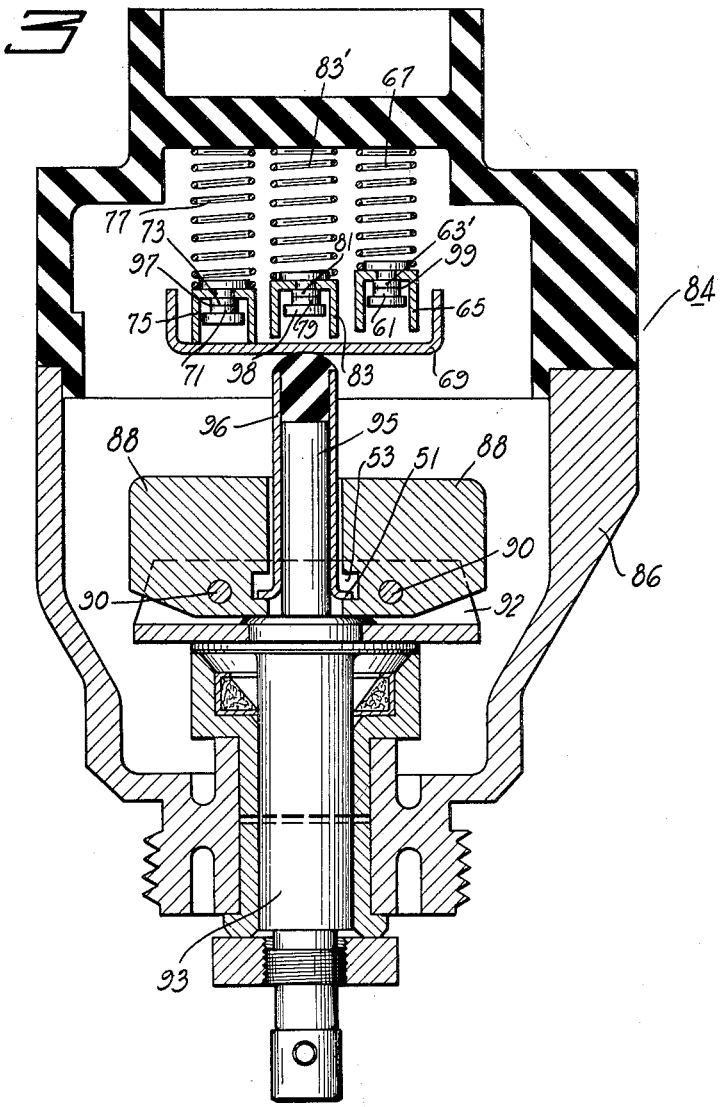
Figure 3 is a view disclosing the details of the governor operated switch mechanism of my invention.

As is disclosed in Figure 3 the switch support members 75, 83, and 65 are preferably mounted at different distances from the top of the switch casing thereby providing a construction resulting in the successive opening of the switches 97, 98, and 99 by the operation of a governor operated follower plate 69. This plate is actuated by the hollow thrust pin 96 which is provided at its base with a flange 51 fitting within recesses 53 in the centrifugal weights 88.

Describing the operation of the governor switch mechanism 84, immediately above a certain vehicle speed, say one effecting a 300 R. P. M. speed of the governor drive shaft 93, the governor mechanism operates to open the switch 97, the channel shaped member 75 being moved upwardly by the follower plate 69 to move the contact 73 away from the contact 71; then immediately above a higher vehicle speed, say one effecting a 500 R. P. M. speed of the shaft 93, the switch 98 is opened; and immediately above a still higher vehicle speed, say one effecting a 700 R. P. M. of the shaft 93, the switch 99 is opened.

Describing now the complete operation of the mechanism of my invention it will be assumed that the engine 34 is operating to make its intake manifold 32 a source of vacuum to energize the clutch operating motor 16. Then when the speed of the vehicle is brought down to effect a closing of the switch 97, that is a speed immediately below a 300 R. P. M. speed of the shaft 93, and the accelerator is released to close the switch 66 and open the valve 26, there results an operation of the motor 16 to disengage the clutch. The driver will now probably operate the transmission 74 to establish the same in a relatively low gear ratio setting whereupon he will depress the accelerator to get the vehicle under way; and this operation of the accelerator results in a closing of the valve 26 effecting a de-energization of the motor 16 to make possible a re-engagement of the clutch. It is also to be noted that regardless of whether or not the accelerator is depressed to close the valve 26, if the speed of the vehicle is increased sufficiently to break the switch 98 then the solenoid 58 is de-energized resulting in a re-engagement of the clutch. As to the latter operation it is to be particularly noted that an increase of vehicle speed to effect a 301 R. P. M. of the shaft 93 will not effect a re-engagement of the clutch inasmuch as the switch 98 is at that time closed thereby maintaining the hold-down switch 25 closed and the coil 63 energized. It is apparent therefore that the lock-in relay 62 functions to prevent a hunting operation of the solenoid 58 around a certain speed of the vehicle there being an appreciable difference between the vehicle speed necessary to effect a disengagement of the clutch and the vehicle speed necessary to effect a re-engagement of the clutch.

Describing the control of the overdrive mechanism 12 the solenoid motor 14 which operates said mechanism is normally energized to effect the overdrive, that is, overdrive setting of the transmission 12; accordingly, it follows that said motor 14 must be de-energized to effect the kickdown that is underdrive setting of the transmission. Now the relay switch 80 of the overdrive control lock-in relay 76 is normally closed; accordingly, when the vehicle is at a standstill or is traveling below governor speed, that is below 500 R. P. M. of the shaft 93, then the switch 98 is made to operate the relay to open the switch 80; and this operation effects the desired underdrive setting of the transmission 12 when the vehicle is at a standstill or is traveling at a relatively low speed. Then to effect an overdrive setting of the transmission 12 it is necessary to increase the vehicle speed sufficiently to open the switch 99 thereby effecting an operation of the relay 76 to close the switch 80; and this operation results in an energization of the solenoid motor 14 to effect the desired overdrive setting of the transmission. It is to be added, however, that the operation of the motor 14 is facilitated by a reversal of the engine torque; and this is effected by a release of the accelerator. Accordingly, the accelerator, by its control of the engine 34 to control the overdrive transmission 12 and its control of the valve 26 and switch 66 to control the clutch control mechanism, becomes a common control for both the transmission 12 and the clutch of the vehicle. As with the above described operation of the clutch control solenoid 58 there is, with the operation of the solenoid motor 14, an appreciable difference in vehicle speeds necessary to effect the two operations of said motor; and this operation is desired inasmuch as there is thus avoided the undesired hunting operation of the switch for controlling said motor.

With the mechanism of my invention the governor operated switch mechanism 60 is operative to successively effect the two operations of the clutch controlling mechanism followed by the operation of the motor 14 to successively effect the two settings of the transmission 12; and with this mechanism there is no hunting operation of the switches which control the operation of said mechanisms.

Although only one embodiment of the invention has been illustrated and described, various changes in the form and relative arrangements of the parts may be made to suit requirements.

I claim:

1. A clutch control mechanism for controlling the operation of a clutch mechanism of an automotive vehicle combined with a mechanism for operating a change speed transmission mechanism of said vehicle, said clutch control and transmission operating mechanisms including a clutch operating motor, means for controlling the operation of said motor including a lock-in relay mechanism, a transmission operating motor, means for controlling the operation of the latter motor including a relay mechanism, and means, including a governor operated switch mechanism, for controlling the operation of both relay mechanisms.

2. A clutch control mechanism for controlling the operation of a friction clutch of an automotive vehicle combined with a mechanism for operating a change speed transmission of said vehicle, said mechanisms being operative to successively establish the transmission in one of its settings, disengage its clutch, re-engage the clutch and establish the transmission in another of its settings and said mechanisms including a lock-in relay mechanism for in part controlling the operation of the clutch control mechanism, a lock-in relay mechanism for in part controlling the operation of the transmission operating mechanism, and governor operated switch means for controlling the operation of both of said relay mechanisms.

3. A clutch control mechanism for controlling the operation of the friction clutch of an automotive vehicle combined with a mechanism for operating a change speed transmission of said vehicle, said mechanisms including means operative, by an operation of the accelerator of the vehicle and in accordance with the speed of the vehicle, to control the operation of said mechanisms to successively establish the transmission in one of its settings, disengage the clutch, re-engage the clutch and establish the transmission in another of its settings, said control means including a lock-in relay mechanism for in part controlling the operation of the clutch control mechanism, a lock-in relay mechanism for in part controlling the operation of the transmission operating mechanism, and vehicle speed responsive governor operated switch means for controlling the operation of the two relay mechanisms.

4. The combination with a mechanism for operating the friction clutch of an automotive vehicle and a mechanism for operating a change speed transmission of said vehicle; of means for controlling the operation of said mechanisms including a lock-in relay mechanism for controlling the operation of the clutch control mechanism, a lock-in relay mechanism for controlling the operation of the transmission operating mechanism, both said relays including a lock-in switch and a coil, and a switch mechanism for controlling the operation of both relay mechanisms, said switch mechanism including three switches one of which serves to control the lock-in switch of one of said relays and also serves to control the relay coil of the other of said relays.

5. The combination with a mechanism for operating the friction clutch of an automotive vehicle and a mechanism for operating a change speed transmission of said vehicle, of means, including electrical means, for controlling the operation of said mechanisms, said electrical means including a lock-in relay mechanism for controlling the operation of the clutch control mechanism, a lock-in relay mechanism for controlling the operation of the transmission operating mechanism, both said relays including a lock-in switch and a coil, and a governor operated switch mechanism for controlling the operation of both of said relay mechanisms said latter switch mechanism including three grounded switches one of which serves to control the lock-in switch of one of said relays and also serves to control the relay coil of the other of said relays.

6. In an automotive vehicle including an internal combustion engine, an accelerator for in part controlling the operation of the engine, a clutch, and an overdrive change speed transmission controlled in part by an operation of the engine the establishment of the overdrive transmission in its overdrive setting being facilitated by a momentary reduction of the speed of the engine by releasing the accelerator; means for successively operating the transmission and clutch including a transmission operating mechanism and a clutch control mechanism, said mechanisms including a motor for operating the transmission, a motor for operating the clutch, and means for controlling the operation of the motors including electrical means comprising a relay for controlling the operation of the transmission operating motor and a relay for controlling the operation of the clutch operating motor, and vehicle speed responsive governor operated switch means for controlling the operation of both of said relays.

7. In an automotive vehicle including an internal combustion engine, an accelerator for in part controlling the operation of the engine, a clutch, and a change speed transmission controlled in part by an operation of the engine the establishment of one setting of the transmission being facilitated by reducing the speed of the engine by releasing the accelerator; means for successively operating the transmission and clutch including a transmission operating mechanism and a clutch control mechanism said mechanisms including a motor for operating the transmission, a motor for operating the clutch, and means for controlling the operation of the motors including an accelerator operated valve for in part controlling the clutch operating motor, electrical means comprising a relay for controlling the operation of the transmission operating motor, and a relay for controlling the operation of the clutch operating motor, and speed responsive means for controlling the operation of said relays.

8. In an automotive vehicle including a change speed transmission and a clutch, means for successively operating the transmission and clutch including a motor for operating the transmission, a motor for operating the clutch, means, including a valve operated by the accelerator of the vehicle, for controlling the operation of the latter motor, and means for controlling the operation of the transmission operating motor, said control means further including electrical means, comprising a relay for controlling the operation of the transmission operating motor, a relay for controlling the operation of the clutch operating motor, a valve operating solenoid controlled in part by the latter relay, and speed responsive means for controlling the operation of both of said relays.

RICHARD H. LONG.

REFERENCES CITED

The following references are of record in the file of this patent:

UNITED STATES PATENTS

| Number | Name | Date |
|---|---|---|
| 2,152,089 | Price et al. | Mar. 28, 1939 |
| 2,159,316 | Breer | May 23, 1939 |
| 2,237,944 | Maurer | Apr. 8, 1941 |
| 2,306,865 | Claytor | Dec. 29, 1942 |
| 2,328,291 | Osborne | Aug. 31, 1943 |
| 2,380,717 | Beltz | July 31, 1945 |
| 2,408,951 | Pollard | Oct. 8, 1946 |
| 2,409,541 | Carnagua | Oct. 15, 1946 |